W. F. SMITH.
FENDER MECHANISM.
APPLICATION FILED MAY 11, 1918.
1,293,224.
Patented Feb. 4, 1919.
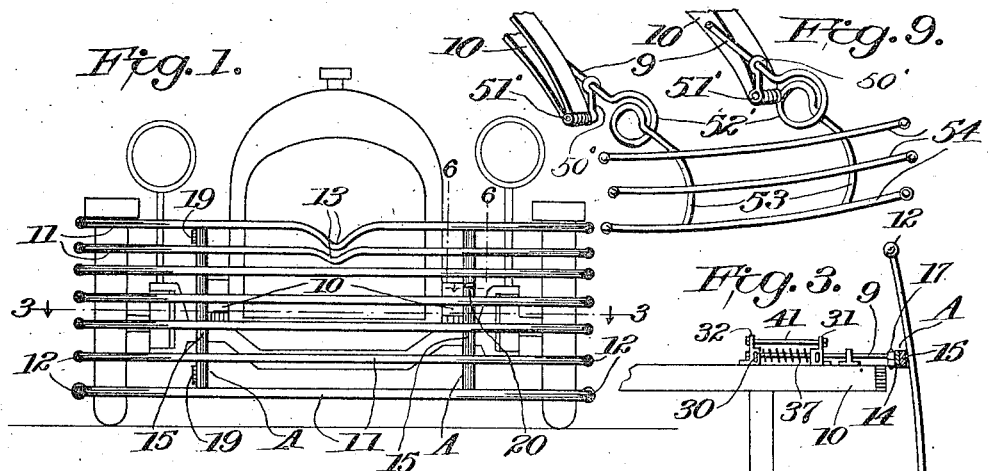
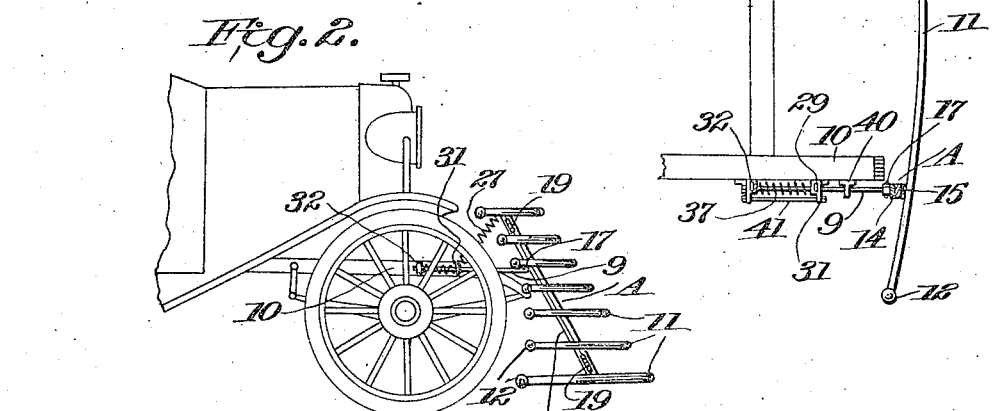
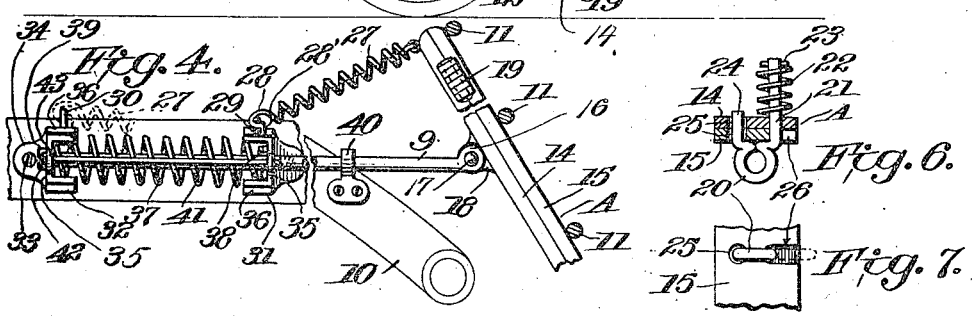
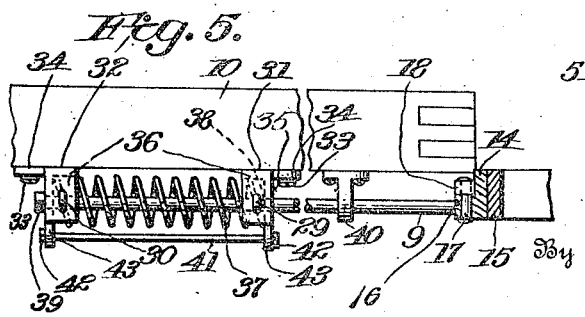
Inventor,
Walter F. Smith,
By
Attorney.

UNITED STATES PATENT OFFICE.

WALTER F. SMITH, OF MINNEAPOLIS, MINNESOTA.

FENDER MECHANISM.

1,293,224.

Specification of Letters Patent. Patented Feb. 4, 1919.

Application filed May 11, 1918. Serial No. 233,886.

*To all whom it may concern:*

Be it known that I, WALTER F. SMITH, a citizen of the United States, residing at Minneapolis, in the county of Hennepin and State of Minnesota, have invented certain new and useful Improvements in Fender Mechanism, of which the following is a specification.

My invention relates to a fender for disposition in advance of the front wheels of a moving body, particularly an automobile.

In carrying out the invention, it has been a desideratum to provide the parts few in number, of strong, simple and durable construction, to the end that they may be manufactured at minimum expense and prove efficient in use.

One important object is to provide a fender of this character normally disposed at an angle and movable on a pivot when it engages an object, toward the front wheels, so as to be closer to the road and minimize chances of the struck object falling under or engaging the wheels. This construction enables the fender to normally remain such a distance above the road as to be free from interference therewith under most conditions.

Another object of the invention is to provide a fender, capable of lateral adjustment, to render the automobile crank and the front of the machine, accessible to the chauffeur or mechanic.

Further objects of the invention are to provide a fender which is cushioned in order to reduce the impact when striking an object; one having the particular means which will be hereinafter described and claimed for the purpose just mentioned; one in which the fender may be fastened at a higher level than normal, when an unusually rough or uneven road is to be traversed, and in this connection to employ a spring means which may urge the fender to its normal position, and be shifted to hold the fender at a higher level.

One preferred embodiment of the invention has been illustrated in accompanying drawings, wherein:—

Figure 1 is a view showing the invention in front elevation and applied to an automobile;

Fig. 2 is a fragmentary side elevation of an automobile having the improved fender fastened thereto;

Fig. 3 is a view taken on the line 3—3 of Fig. 1, with most of the automobile structure removed;

Fig. 4 is a view showing a cushioning means of the fender in side elevation, in connection with a fragment of a side beam of the automobile chassis, and a fragment of the fender;

Fig. 5 is a top view of the parts of Fig. 4, with the spring of the fender, and a fragment of the fender removed;

Fig. 6 is a cross sectional view on the line 6—6 of Fig. 1;

Fig. 7 is an enlarged fragmentary view illustrating the means for fastening the fender against lateral pivotal movement, Fig. 8 is a fragmentary view suggesting a modified form of fender, and Fig. 9 is a perspective view of a modified form.

Referring specifically to the drawing, the fender mechanism is primarily supported by rods or bars 9, one projecting beyond each side beam of the automobile chassis as suggested at 10 and with which side beams, the rods are parallel. The fender proper comprises horizontal bars or rods 11 joined by bar devices A, which are preferably disposed at an angle obtuse to the horizontal as well shown in Fig. 2. These bars or rods may be made of any suitable material or configuration, preferably having balls or knobs 12 at their ends, to help the ornamental effect, and if desired, one or more of these bars may be bent as at 13, to facilitate access to the crank shaft of the automobile. It is to be understood therefore that this particular form of fender is shown by way of example only.

Each bar device A comprises a bar 14 and a bar 15. Bars 14 are normally disposed at an angle and are pivoted to the rods 9 by means of bolts or the like 17 which extend through the rods at lugs 16 thereon and also through lugs 18 extending from the bars 14. Bars 15 rest on the bars 14, and one of the bars 15 is pivoted to its companion bar 14 by means of hinges at 19. This hinge connection permits of the bar 15 to swing laterally to the bar 14 to an open position so that the two bars form a hinge.

Any suitable means is employed to releasably secure the other bar 15 against its companion bar 14, and one form of such means is suggested in Figs. 1, 6 and 7. This means may comprise a latch having a manipulating ring 20 from which an arm 21 turnably and slidably extends through openings in the bars 14 and 15, as shown in Fig. 6. Beyond the bars 14, a coil spring 22 surrounds arm 21 bearing against bar 14 and a pin or other abutment 23 on the arm 22. Spring 22 serves to normally hold a lock pin 24 in openings or recesses 25 in these bars. The opening through which arm 21 passes, in the bars 15, is a slot 26. Thus an operator may engage the member 20, pull the latch outwardly so that the pin 24 will disengage the opening 25, then turn the latch to the dotted line position in Fig. 7. The bar 15 may thus freely swing away from the bar 14, and on the pivot 19. This hinge feature of the fender is very important inasmuch as the fender as a whole, especially when it is in a horizontal position, to which it may be adjusted as will be later described, in order to permit ready access to the entire front of the automobile.

A spring 27 is fastened to the bars 14 and to another suitable part, in this position being tensioned so as to expand and maintain the bar devices in the position shown in the drawings. One end of this spring may be formed into a hook 28 to releasably engage a staple 29. On the pivots 17, the fender as a whole may be moved to the horizontal position previously referred to, and in this position, fastened by passing the hook 28 through a staple 30 as suggested by the dotted spring fragment in Fig. 4. In this position, the spring pulls the fender toward it and thus holds it in a substantially horizontal position. The fender is to be raised to the horizontal position, principally when an unusually rough or uneven road is to be traversed.

In connection with each rod 9, a housing 31 and a housing 32 are employed. Each housing is suitably mounted on the chassis of the automobile and preferably on the sides of the side beams 10, being fastened thereto by means of screw bolts 33 passing through lugs or tangs 34 thereof. Rods 9 slide through the laterally extending walls of these housings which are designated 35. Extending inwardly from the walls 35 are arcuate walls 36. Intermediate the walls 35, and surrounding the rods 9, are expansive coil springs 37. These springs are received by the walls 36 and they bear against suitable abutments, for instance pins 38, affixed to the rods 9 in order to normally project the rods. Exteriorly of the housing 32, a nut 39 engages the rods 9 and intermediate the fender and the housing 31, the rods 9 may pass through suitable bearings 40 if desired.

In order to suitably brace the housings, a bolt 41 is fastened thereto by means of nuts 42 passing through lugs 43 of the housings. These housings are preferably formed in a single piece and on the housings 31 staples 29 are conveniently fastened while staples 30 are conveniently fastened to the housings 32.

In operation, when the fender strikes an object, it will move inwardly, sliding the rods 9 which are cushioned by the springs 37. At the same time, the fender is tilted on the pivots 17, so that it moves in closer contact with the ground to minimize the danger of the object falling under and being struck by the automobile wheels. Tilting on pivots 17 is against the tension of the spring 27. Thus when the object is removed from against the fender, springs 37 will urge the rods 9 outwardly and the springs 27 will urge the fender to its normal position. As previously explained, when it is desired to traverse an unusually rough road, the hook 28 is disengaged from staple 29 and fastened to staple 30 as suggested in Fig. 4, so that the fender will be moved to and held in a substantially horizontal position. In this horizontal position, or while the fender is normally disposed, the latch 20 may be operated, to permit swinging of the fender laterally on the hinges or pivots 19.

Since I have shown and described merely the preferred embodiment of the invention, it is to be understood that many changes in the details of construction, combination and arrangement of the parts, may be resorted to within the spirit and scope as defined by appended claims.

For instance, a modified form is diagrammatically shown in Fig. 8.

In this form, the equivalent of rods or bars 11 are shown at 50, being joined by bars 51, the equivalent of bars 15. It will be noticed that a space 52 is provided intermediate the bars 50. This space permits ready access to the front of the vehicle and particularly to the crank shaft. With this form, in view of the space 52, lateral swinging movement of the fender section will seldom be needed and therefore the bars 15 and the hinges 19 may be dispensed with.

In the other modified form, namely of Fig. 9 the rods 9 are supported by and slidable in bearings 50' bolted at 51' to the side beams 10, by the usual bolts at that location. Beyond the bearings the rods are formed into resilient coils 52' beyond which the rods extend downwardly at 53 and have the fender bars 54 secured thereto. The coils 52' cushion or yieldingly support the fender as will be understood.

I claim:—

1. A fender mechanism having a fender, means permitting adjustment of the fender, a plurality of fixed fastening members, and a resilient means operable to selectively engage the fastening members, to secure the fender to different adjusted positions.

2. A fender mechanism having a fender, means pivoting the fender for movement on a horizontal axis, a spring associated with the fender, means engageable by the spring to maintain the fender in a normal position, and means engageable by the spring to also maintain the fender in an adjusted position.

3. A fender mechanism having a fender, means pivoting the fender for movement on a horizontal axis, a spring associated with the fender, staples engageable by the spring to maintain the fender in a normal position, and staples engageable by the spring to also maintain the fender in an adjusted position, and the spring having a lug to directly abut the staples for the purpose set forth.

4. A fender mechanism having a fender, a spring to fasten the fender in position, an eyelet member, and said spring having a portion passing through the eyelet member and having a lug directly abutting the eyelet member for the purpose set forth.

5. A fender mechanism having a fender, and means adjustably mounting the fender for upward movement to permit access to the front of the vehicle to which the fender is attached.

6. A fender mechanism having a fender, and inclined pivot means mounting the fender for upward and lateral movement to permit access to the front of the vehicle to which the fender is attached.

7. A fender mechanism having a fender, supporting means at the front of the vehicle with which the fender is associated and on which the fender normally rests, and means mounting the fender for manual adjustment relatively to the said means on which it rests to permit access to the front of the vehicle.

8. A fender mechanism having a fender, separated supports at the front of the vehicle to which the fender is attached and on which the fender normally rests, said fender bridging said supports, and means permitting manual movement of the fender away from one of the supports to permit access between the supports to the front of the vehicle.

9. A fender mechanism having a fender, said fender having first bars, means to hinge said bars together, second bars for the fender, and a latch means associated with the second bars to normally prevent movement thereof relatively.

10. A fender mechanism having a fender, a rod extending from the fender, bearing members for the rod, springs mounted by the bearing members, abutment means on the rod engaging the spring, said fender being adjustably connected to the rod, a fastening member extending from the fender, and means on the bearing members detachably engageable by said fastening member.

11. A fender mechanism having a fender, a rod extending from the fender, housings having bearing walls in which the rod is slidably disposed, ears extending from the walls, fastening means passing through the ears to mount the housings, a spring intermediate the walls, and means on the rod to abut the springs, walls extending from said walls overlapping the spring, and reinforcing means joining the housings.

12. In fender mechanism, a fender, a rod extending from the fender, housings having bearing walls in which the rod is slidably disposed, a spring surrounding the rod and bearing against said walls, fastening lugs integral with the housings, extending at an angle to said walls, inwardly extending walls integral with said walls overlapping said spring, means on the rod to abut said spring, second lugs extending from said bearing walls, and a fastening bolt coöperating with said second walls.

13. In fender mechanism, a fender, a rod, means pivoting the fender to the rod, a spring extending from the fender having a hook, housings having bearing walls in which the rod is slidably disposed, a spring surrounding said rod, and engaging said walls, abutment means on the rod engaging said spring, walls extending from the bearing walls and overlapping the spring, and staples carried by the overlapping walls with which said hook detachably engages selectively.

14. In fender mechanism, a fender, a rod supporting the fender, means to yieldingly and slidingly mount the rod on an automobile side beam, a bearing for the rod rising from the side beam, and fastening means extending transversely of the said beam to secure it in place.

In testimony whereof, I have affixed my signature in the presence of two witnesses.

WALTER F. SMITH.

Witnesses:
JOHN WALMSLEY,
D. G. GRAHAM.